UNITED STATES PATENT OFFICE.

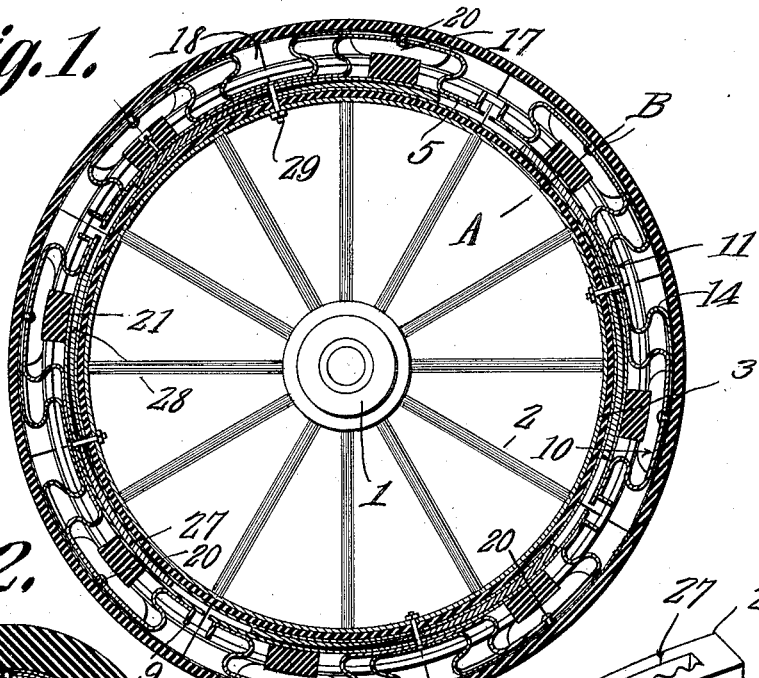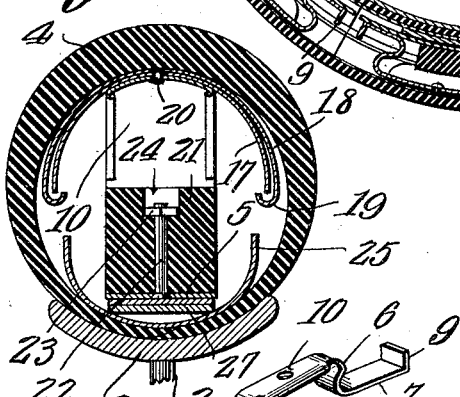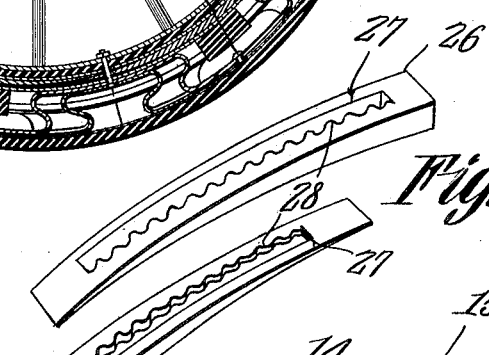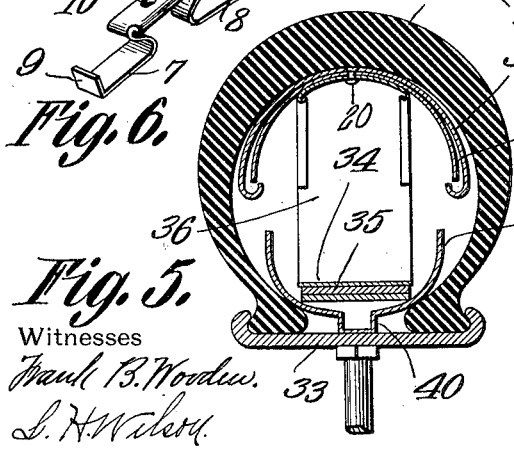

CHRISTIAN A. SPITTELL, OF NEWARK, NEW JERSEY.

AUTOMOBILE WHEEL-TIRE.

1,070,551.  Specification of Letters Patent.  Patented Aug. 19, 1913.

Application filed August 23, 1911.  Serial No. 645,570.

*To all whom it may concern:*

Be it known that I, CHRISTIAN A. SPITTELL, a citizen of the United States, residing at Newark, in the county of Essex and State of New Jersey, have invented a new and useful Automobile Wheel-Tire, of which the following is a specification.

It is the object of the present invention, generally speaking, to provide a tire, the resiliency of which is afforded by a series of internal springs, of novel and improved construction.

A further object of the invention is to provide a series of carrying members, each carrying member being provided with a set of springs, and means being provided for adjusting the position of each carrying member, so that its springs may be made to bear with different pressures, against the inclosing tire.

A further object of the invention is to provide a series of coöperating elements of novel form, adapted to adjust the tension of the springs of the tire, and to provide means whereby these elements may be held in adjusted relations with respect to each other.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a longitudinal section of a wheel equipped with a tire constructed in accordance with the present invention; Fig. 2 is a section on the line A—B of Fig. 1; Fig. 3 is a detail perspective, showing the adjusting wedges; Fig. 4 is a detail perspective of one of the secondary springs; Fig. 5 is a transverse section showing a modified form of the invention; and Fig. 6 is a detail perspective of one of the primary springs.

In the accompanying drawings, the numeral 1 denotes the hub of a wheel, the same carrying the spokes 2, the spokes 2 supporting the rim 3, which may be of any desired construction.

In the present instance, there is supported upon the rim 3, a tire casing 4, the same being of tubular form. Located within the tire casing 4 and extending circumferentially of the wheel, are a series of segmental carrying members 5, preferably taking the form of flat plates. Primary springs 6 are provided, the springs 6 being substantially co-equal in length with the carrying members 5. Each primary spring 6 consists of end portions 7 and an intermediate portion 8, the extremities of the end portions 7 being upturned, as shown at 9. Between the end portions 7 and the intermediate portion 8, spring loops 10 are formed, the loops 10 overhanging the portions 7 and 8 of the primary springs 6, as seen most clearly in Fig. 6.

The invention further includes a series of secondary springs, denoted generally by the numeral 11. The secondary spring 11 consists of an intermediate portion 12, adapted to rest upon the intermediate portion 8 of the primary spring 6. The secondary spring 11 is reversely curved, as shown at 14, and its ends 15 rest upon the adjacent ends of the loops 10 of the primary springs 6. The ends 15 are transversely curved, as shown at 16, to avoid cutting the casing 4.

Supported by the loops 10 of the primary springs 6, are inner, trough-shaped supporting plates 17, of resilient construction, and superposed upon the inner supporting plates 17, are outer, resilient, similarly formed supporting plates 18, the edges 19 of which are curved inwardly, to avoid a cutting of the casing 4, the outer supporting plates 18 being in immediate contact with the tire, as clearly shown in Fig. 2.

Located within the loops 10 of the primary springs 6, and resting upon the carrying members 5, are resilient blocks 21, preferably fashioned from rubber, the blocks 21 being secured to the carrying members 5 by means of attaching elements 22, the nuts 23 of which are housed in recesses 24 in the outer faces of the blocks 21, the outer faces of the blocks 21 being spaced apart from the outer portions of the loops 10 of the primary springs 6. The securing element 20 serves to unite the loops 10 of the primary springs with the supporting plates 17 and 18.

Located within and resting upon the tire casing 4, adjacent the rim 3, are a series of arched plates 25, the free edges of which extend outwardly toward the periphery of the wheel. Between the arched plates 25 and the carrying members 5, wedges 26 are extended, circumferentially of the wheel. The wedges 26 are equipped with longitudinally extended slots 27, having serrations or seats 28 in their opposite edges. Securing elements 29 are extended through the intermediate portions of the secondary springs 11, through intermediate portions 8 of the primary springs 6, through the slots 27 in the wedges 26, and through the rim 3.

In that form of the invention which appears in Fig. 5, the tire casing is denoted by the numeral 32, and is of clencher construction, the rim 33 being constructed accordingly. A carrying member is shown at 34, and the wedges at 35, the primary spring being denoted by the numeral 36, and the supporting plates by the numerals 37 and 38. The arched plate 39, corresponding to the plate 25 of Fig. 2 is modified, by the addition of a longitudinally extended rib 40, adapted to bear upon the rim 33 between the edges of the tire casing 32. That form of the invention which appears in Fig. 5, operates in precisely the same manner as that form of the invention which is shown in Fig. 1, the construction shown in Fig. 5 being merely modified slightly, in order to accommodate a clencher tire.

It will be seen that the invention includes a plurality of carrying members 5, each carrying member being provided with its primary and secondary springs, adapted to support the tire casing 4. Likewise, there is a set of adjusting wedges 26 for each carrying member 5. The construction, therefore is such that each carrying member may be moved toward and away from the hub 1 of the wheel, thereby to alter the solidity of the tire 4. It is therefore possible, in wet weather, to have a relatively flaccid tire, which will afford the necessary hold upon the pavement and prevent slipping; whereas, upon the other hand, by adjusting the wedges 26, the tire may be made solid, for use in time of dry weather, when there is no danger of slipping. The wedges 26 may be adjusted readily, the tire being removed from the wheel and being disassembled to effect such adjustment. The securing element 29, engaging the teeth 28, serves as a means for holding the wedges 26 in the positions which they may have been forced to assume. Owing to the fact that the ends 15 of the secondary springs 11, bear upon the ends of the loops 10 of the primary springs 6, the casing 4 is given an increased support, circumferentially of the wheel. Should the springs 6 be compressed unduly in their looped portions 10, the portions 10 will be received by the resilient blocks 21. The inner edges of the supporting plates 17 and 18 are located beyond the outer edges of the arched plates 25, and consequently these elements cannot come into contact, when the tire casing 4 is compressed.

Having thus described the invention, what is claimed is:—

1. A device of the class described comprising a casing; primary springs located within the casing, longitudinally of the same, the primary springs consisting of end portions and an intermediate portion, located in a common plane, there being loops connecting the intermediate portion with the end portions, the loops being adapted to exert an outward thrust against the casing; secondary springs resting upon the intermediate portion of the primary spring, the secondary springs being reversely curved, and having their ends resting upon the ends of the loops of the primary springs.

2. A device of the class described comprising a casing; primary springs located within the casing, longitudinally of the same, the primary springs consisting of end portions and an intermediate portion, located in a common plane, there being loops connecting the intermediate portion with the end portions, the loops being adapted to exert an outward thrust against the casing; secondary springs resting upon the intermediate portions of the primary spring, the secondary springs being reversely curved, and having their ends resting upon the ends of the loops of the primary springs, a segmental carrying member, upon which the springs are carried; and means interposed between the carrying member and the inner portion of the casing, to thrust the carrying members outwardly, thereby to increase the pressure of the springs against the outermost portion of the casing.

3. A device of the class described comprising a casing; primary springs located within the casing, longitudinally of the same, the primary springs consisting of end portions and an intermediate portion, located in a common plane, there being loops connecting the intermediate portion with the end portions, the loops being adapted to exert an outward thrust against the casing; secondary springs resting upon the intermediate portions of the primary spring, the secondary springs being reversely curved, and having their ends resting upon the ends of the loops of the primary springs; a carrying member whereby the springs are supported; opposed wedges located between the carrying member and the innermost portion of the casing, the wedges being provided with longitudinal slots having seats in their opposite edges; a rim upon which the casing is supported; and a securing element extended through the rim, through the carrying members, and through the springs, the securing element being adapted to register successively in the seats, thereby to maintain the wedges against movement.

4. A device of the class described comprising a casing; a segmental carrying member supported within the casing; a spring mounted upon the carrying member and adapted to exert a thrust against the outermost portion of the casing; and inner and outer transversely, arched, supporting plates carried by the outermost portion of the spring and bearing against the outermost portion of the casing, the edges of the supporting plates diverging adjacent the sides of the casing.

5. A device of the class described comprising a casing; a carrying member; a looped, casing supporting spring secured to the carrying member; a resilient trough-shaped supporting plate carried by the outermost portion of the spring and spaced at its edges from the sides of the casing, the plate bearing against the tread of the casing and a transversely arched plate bearing against the innermost portion of the casing and supporting the carrying member, the edges of the plate being spaced from the sides of the casing.

In testimony that I claim the foregoing as my own, I have hereto affixed my signature in the presence of two witnesses.

CHRISTIAN A. SPITTELL.

Witnesses:
J. C. RAPPLEYE,
HENRY W. EGNER, Jr.

---

Copies of this patent may be obtained for five cents each, by addressing the "Commissioner of Patents, Washington, D. C."